United States Patent Office 3,560,426
Patented Feb. 2, 1971

3,560,426
COATING COMPOSITION OF AN AMINE TERMINATED PRECURSOR OF AN IMIDE POLYMER AND A MELAMINE RESIN
Paul L. Adesko, Mount Prospect, Ill., assignor to E. I. du Pont de Nemours and Company, Wilmington, Del., a corporation of Delaware
No Drawing. Continuation-in-part of application Ser. No. 670,754, Sept. 26, 1967. This application July 16, 1968, Ser. No. 745,136
Int. Cl. C08g 37/30, 37/32, 51/44
U.S. Cl. 260—30.2                                     19 Claims

ABSTRACT OF THE DISCLOSURE

A coating composition having a low viscosity particularly useful for wire coating which comprises: (A) an amine terminated aromatic polymeric precursor of an imide containing polymer which precursor is either a polyamic acid, a polyamide-amic acid, or a mixture thereof; and (B) a reactive melamine resin.

CROSS-REFERENCE TO RELATED APPLICATION

This application is a continuation-in-part of my copending application Ser. No. 670,754, filed Sept. 26, 1967.

BACKGROUND OF THE INVENTION

This invention relates to a coating composition of a polymeric precursor of an imide containing polymer and, in particular, to a low viscosity coating composition of a polyimide precursor and a melamine resin that is useful for wire coating.

Coating compositions of solvent soluble polymeric precursors for imide containing polymers are well known. These coating compositions after application to a substrate are readily converted by heat, chemicals or a combination of both to an imide containing polymer.

The earliest and best known of the above precursors are polyamic acids as defined in Edwards U.S. Pat. 3,179,-614, issued Apr. 20, 1965. Other species of these polyamic acids are described in Lavin et al. U.S. Pat. 3,190,-856, issued June 22, 1965. Other species are described in Frost et al. U.S. Pat. 3,179,635, issued Apr. 20, 1965 and Loncrini U.S. 3,182,073, issued May 4, 1965. Conversion of these polyamic acids to polyimides is described in Edwards U.S. 3,179,634, issued Apr. 20, 1965. Polyamide-amic acid precursors and polyamide-imide polymers are described in Sorenson U.S. patent application Ser. No. 472,314, filed July 15, 1965, and in Lavin et al. U.S. 3,260,691, issued July 12, 1966. Any of the aforementioned polymeric precursors can be used in the novel coating composition of this invention provided that the precursor is amine terminated which is generally accomplished by using an excess of amine in the preparation of the precursor. The disclosure of each of the above patents and the application is hereby incorporated by reference.

The above mentioned soluble precursors have been widely used as coating compositions for a variety of substrates to give coatings that are resistant to high temperatures that have excellent flex and break resistance and excellent electrical insulation properties. Generally, the precursor is applied to a substrate as a coating and the coating is heated to convert the precursor to a polyimide and to remove solvent. To minimize the problems of solvent removal, such as blistering of the coating, the amount of solvent in the coating is kept as low as possible. Also, to form an imide polymer having a high inherent viscosity which is tough and durable, it has been necessary to use precursor coating solutions of a higher viscosity than is desired in some situations, particularly, in the coating of fine gauge wire.

In the application of the above prior art precursor solutions to fine gauge wire, the preferred high speed coating and converting operations sometimes give a nonuniform coating and also cause blistering of the coating. A need exists for polyimide precursor coating solutions that have a lower viscosity at a high polymer solids content than known precursor solutions while using polyimide precursors which still give a tough, durable, high temperature resistant polyimide coating. These solutions would permit, among other advantages, the coating of fine gauge wires at high speeds without blistering the coating or forming a nonuniform coating.

SUMMARY OF THE INVENTION

The present invention provides a low viscosity high solids content coating solution of materials which are readily converted to imide containing polymers that are tough, durable and high temperature resistant.

The coating composition of this invention comprises, in a solution in a suitable organic solvent, the following two components:

(A) an amine terminated aromatic precursor polymer capable of being converted into an imide containing polymer, said precursor polymer having one of the following recurring structural units:

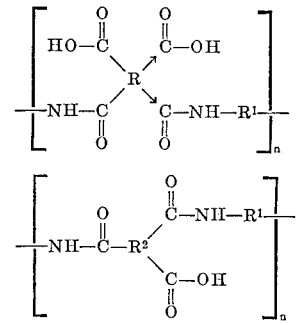

or a mixture of (1) and (2) above; wherein the arrows denote isomerism; wherein $n$ is a positive integer sufficiently high to provide a film-forming polymer having an inherent viscosity at 25° C. of at least 0.1, and preferably, 0.3 to 5.0, measured at about 0.5% solids in N-methyl pyrrolidone; wherein R is a tetravalent aromatic radical, $R^1$ is a divalent aromatic radical and $R^2$ is a trivalent aromatic radical; and (B) a reactive melamine resin of the formula:

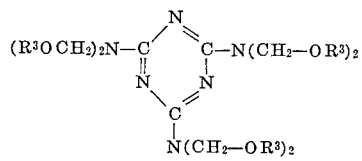

wherein $R^3$ is hydrogen or an alkyl radical having 1–8 carbon atoms with not more than two of the $R^3$ groups being hydrogen. Preferably, $R^3$ is an alkyl group of 1–8 carbon atoms and more preferably, $R^3$ is methyl.

Preferably, the coating composition of this invention has a solids content of about 5–30% by weight, and more preferably, about 15–25% solids by weight, and preferably, has a solution viscosity of about 1–25 poises and more preferably, about 5–15 poises. Also, the preferred coating composition which forms particularly tough, durable and temperature resistant coatings of this invention contains about 1–10% by weight of the above melamine resin and about 99–90% by weight of the above amine terminated aromatic polymer, based on the combined weight of the (A) and (B) components. More particularly, to form coatings having particularly good physical properties, the novel coating composition of this invention contains about 2–5% by weight of the melamine resins and 98–95% by weight of the amine terminated aromatic polymer. It will be understood that component (A) of the compositions of this invention may already be partially imidized provided it remains in solution.

DESCRIPTION OF THE INVENTION

The polyamic acid used as the preferred component (A) of the novel coating composition of this invention is prepared by reacting a dianhydride of an aromatic tetracarboxylic acid with an excess of an aromatic diamine. Excess diamine is used to provide a polymer with terminal amine end groups. Preferred polyamic acids are those described in the aforementioned U.S. Pat. 3,179,614.

The aromatic tetracarboxylic acid dianhydrides that form polyamic acids used in this invention have the formula:

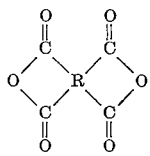

where R is a tetravalent aromatic radical. The preferred dianhydride is pyromellitic dianhydride since it gives a polyamic acid which is convertible into a polyimide that has excellent physical properties. Other dianhydrides that are useful are, for example, 3,3′4,4′-diphenyltetracarboxylic dianhydride,
2,2′3,3′-diphenyltetracarboxylic dianhydride,
1,2,5,6-naphthalenetetracarboxylic dianhydride,
1,2,4,5-naphthalene tetracarboxylic dianhydride,
1,4,5,8-naphthalenetetracarboxylic dianhydride,
2,3,6,7-naphthalenetetracarboxylic dianhydride,
3,3′-methylenediphthalic anhydride,
1,2-bis(4-phthalic anhydride) ethane,
4,4′-ethylenediphthalic anhydride,
3,3′-ethylidenediphthalic anhydride,
4,4′-ethylidenediphthalic anhydride,
4,4′-isopropylidenediphthalic anhydride,
bis-(3,4-dicarboxyphenyl) sulfone dianhydride,
4,4′-sulfidediphthalic anhydride,
4,4′-oxydiphthalic anhydride,
3,3′4,4′-benzophenonetetracarboxylic dianhydride and its position isomers.

Representative useful diamines for forming polyamic acids used in this invention have the formula:

$$H_2N-R^1-NH_2$$

where $R^1$ is a divalent aromatic radical. Preferred diamines include:

meta-phenylene diamine,
para-phenylene diamine,
1,8-naphthalene diamine,
2,7-naphthalene diamine,
2,2′-biphenylene diamine,
3,3′-biphenylene diamine
4,4′-biphenylene diamine, and the like; methylene dianiline,
oxydianiline-(4,4′-diaminodiphenyl ether),
4,4′-diaminobenzophenone,
4,4′-diaminodiphenylsulfide,
3,3′-diaminodiphenylsulfide,
4,4′-diaminophenylsulfone,
bis-(4-aminocyclohexyl)methane,
1,2-bis-(4-aminocyclohexyl)ethane,
1,1-bis-(4-aminocyclohexyl)propane, and the like.

Diamines that are particularly preferred since they form imide containing polymers that have excellent physical properties are: oxydianiline, methylene dianiline and meta or para phenylene diamine.

To form an amine terminated polymer, an excess of the diamine is used but not more than 50% molar excess of diamine is used, and preferably, not more than a 25% molar excess of diamine is used. To give a wire enamel composition with excellent properties and with a low solution viscosity which is desirable for coating fine wires, the molar excess of diamine used to form the polyimide precursor is about 5–15 mole percent.

Another preferred composition used as the (A) component of the novel coating composition of this invention is a polyamide-amic acid. Polyamide-amic acids are readily prepared by reacting the anhydride of an aromatic tricarboxylic acid with one of the aforementioned aromatic diamines. More specifically, the polyamide-amic acid is prepared, for example, by reacting the acid halide of trimellitic anhydride with an aromatic diamine using the procedure described in the aforementioned U.S. Pat. 3,260,691.

The aromatic tricarboxylic anhydride which is used to form the above polyamide-amic acid used in the novel coating composition of this invention is of the formula:

where $R^2$ is a trivalent aromatic radical. The following tricarboxylic anhydrides are useful for forming the polymer used to form the novel coating composition of this invention:

trimellitic anhydride,
2,3,6-naphthalenetricarboxylic anhydride,
1,5,6-naphthalenetricarboxylic anhydride, and the like,
2,6-dichloronaphthalene-4,5,7-tricarboxylic anhydride, and the like,
(carboxyphenyl) (dicarboxyphenyl anhydride)methane,
(carboxyphenyl) (dicarboxyphenyl anhydride)ether,
(carboxyphenyl) (dicarboxyphenyl anhydride)sulfone,
(carboxyphenyl) (dicarboxyphenyl anhydride)ketone.

The ester of any of the aforementioned tricarboxylic anhydrides, for example, 4-phenyl trimellitate anhydride or the acid halide, for example, 4-acid chloride of trimellitic anhydride can also be used.

Preferably, trimellitic anhydride is used since this compound is readily available and forms a polymer that has excellent physical properties. The phenyl ester of trimellitic anhydride is also preferred since this compound reacts readily and does not produce unwanted byproducts in the reaction.

As stated above, any of the aforementioned aromatic diamines used to form the polyamic acid can be used with the above aromatic tricarboxylic acid anhydrides to form polyamide-amic acids which are used in the coating composition of this invention. The aforementioned preferred aromatic diamines are also the preferred diamines for the above polyamide-amic acids since these diamines form polymers that have particularly good physical properties.

The reactive melamine resin which is the (B) component of the novel coating composition of this invention is preferably prepared by reacting melamine with formaldehyde and then reacting this product with an alcohol having 1-8 carbon atoms. These resins are prepared according to the processes described in Kun et al. U.S. 2,918,452, issued December 22, 1959; Jefts et al. U.S. 2,998,410, issued Aug. 29, 1961, and Housekeeper U.S. 2,998,411, issued Aug. 29, 1961, which patents are hereby incorporated by reference. Generally, these melamine resins are mixtures of partially methylolated and partially alkylated melamines, e.g., a mixture of penta-alkoxymethylmelamine and tetra-alkoxy-methylmelamine; wherein the alkoxy group may be of an alcohol having 1-8 carbon atoms. Pentamethyoxymethylmelamine, tetramethoxymethylmelamine or a mixture of these two resins can be used as the reactive melamine resin in this invention. Preferred, are the fully methylolated and alkylated melamines since these products form a coating composition with excellent shelf stability when blended with the aforementioned polyimide precursors since these melamines generally do not react with the polyimide precursors at room temperature.

These preferred melamine resins are hexa-alkoxymethylmelamine resins in which the alkoxy group has 1-8 carbon atoms. The following are examples of some of these preferred melamine resins: hexamethoxymethylmelamine, hexaethoxymethylmelamine, hexapropoxymethylmelamine, hexabutoxymethylmelamine, hexapentoxymethylmelamine, hexahexoxymethylmelamine, hexaheptoxymethylmelamine, hexoctoxymethylmelamine and the like. Hexamethoxymethylmelamine is the preferred melamine resin since it forms a stable coating composition and gives coatings with excellent high temperature resistance and with excellent electrical properties.

Any suitable inert organic solvent can be used for the coating composition of this invention and many illustrative ones are disclosed in the patents referred to above. Liquids, such as N,N-dimethylformamide, N,N-dimethylacetamide and N-methyl-2-pyrrolidone are preferred. Other solvents which may be used in the present invention are: N,N-diethylformamide, N,N-diethylacetamide, N,N-dimethylmethoxyacetamide, N-methylcaprolactam, dimethyl sulfoxide, tetramethylurea, pyridine, dimethyl sulfone, hexamethylphosphoramide, tetramethylenesulfone, formamide, N-methylformamide, butyrolactone and N-acetyl-2-pyrrolidone, ketones, such as methylethyl ketone, methylisobutyl ketone; nitroalkanes, such as nitroethane, nitropropane, etc. The solvents can be used alone, in combinations of solvents, or in combination with poorer solvents, such as benzene, benzonitrile, dioxane xylene toluene and cyclohexane. One preferred solvent mixture is an 80:20 parts by weight mixture of N-methyl-2-pyrrolidone and xylene.

The novel coating composition prepared in accordance with the invention is in convenient form for direct utility as an insulating varnish or preparation of high melting shaped articles requiring rigidity and high dielectric characteristics. Whatever the application or geometric shape utilized, the coating composition of this invention is conveniently converted to imide-containing polymer by heating at about 50-200° C. for about 200-10 minutes. In one method for obtaining a high quality product, the shaped material is heated at about 80-150° C. for about 120-30 minutes or until substantially all solvent is removed and the mixture sets up and becomes film. This aids in reducing brittleness and cracking in the final polymer to a minimum. Thereafter the temperature is raised to about 150-500° C. for 1000-1 minutes and preferably, 200-400° C. for about 500-2 minutes or until substantially all polyimide precursor and the melamine resin are reacted, the above lower temperatures being accorded the longer times.

The novel low viscosity coating composition is very useful in high speed wire coating operations and in particular for very fine wire. Wire coating speeds of 20-100 feet per minute or higher can be used with an oven temperature of about 250-450° C. with the novel composition of this invention. Wire coated under these conditions with the novel coating composition of this invention, which has a low solution viscosity but a high solids content, gives a product that is blister free and that has a uniform coating and has excellent electrical insulation properties and is resistant to high temperatures.

It will be realized that the compositions of this invention may be modified by adding other monomeric or polymeric materials prior to or even after shaping into a desired form preparatory to heating. Materials such as epoxy resins, silicone resins, phenolic resins, polyamide resins, polyester resins, aminoplast resins, polybenzimidazoles, polyimides and precursors thereof, polytetrafluoroethylene and copolymers thereof, polyphenylene oxides, polyoxadiazoles, polyvinylformal acetal or butyral resins, polyurethanes, and the like, can be included. In some instances as much as 50% or more modifying material can be added. Also, of course, inert materials, such as pigments, dyes, organic and inorganic fillers, may be added prior to or subsequent to shaping.

The novel coating composition of this invention is useful for coating heat resistant substrates, such as metals, glass, glass fabrics, all aromatic polyamide fabrics, asbestos fabrics, and polytetrafluoroethylene sheets and fabrics. Also, the novel coating composition of this invention can be used to form laminates of any of the aforementioned heat resistant substrates.

The invention will be more clearly understood by referring to the examples which follow. All parts are by weight unless otherwise indicated.

EXAMPLE 1

The following ingredients are charged into a reaction vessel to form an amine terminated polyamic acid polymer:

| Portion 1: | Parts by weight |
| --- | --- |
| N-methyl pyrrolidone | 3167 |
| Xylene | 792 |
| Oxydianiline | 500 |
| Portion 2: | |
| Pyromellitic dianhydride | 490 |
| Total | 4949 |

Portion 1 is charged into a reaction vessel equipped with a stirrer and a thermometer and the oxydianiline is dissolved in the solvent by stirring the mixture. The molar ratio of dianhydride to diamine is about 9:10. Portion 2 is slowly added to the solution while the reaction mixture is being agitated and the temperature of the reaction mixture is maintained at about 30-35° C. by cooling the mixture. The reaction mixture is held at 30-35° C. for about 1 hour and the mixture is then cooled at 25° C. The resulting polymer solution has a solids content of about 20% solids by weight and a solution viscosity of about 5-10 poises. The viscosity is measured at 25° C. with a Brookfield viscometer. The amine terminated polymer has an inherent viscosity at 25° C. in N-methyl pyrrolidone of about 0.3-0.5.

The following ingredients are charged into a vessel and blended together at room temperature for about 20 minutes to form a wire enamel composition:

| | Parts by weight |
| --- | --- |
| Polymer solution (Prepared above containing 20% polymer solids) | 1980 |
| N-methyl pyrrolidone | 41 |
| Xylene | 11 |
| Hexamethoxymethylmelamine (prepared according to U.S.P. 2,998,411) | 13 |
| Total | 2045 |

The resulting wire enamel composition has a solids content of 19.5% solids by weight and a viscosity at 25° C. of 6.4 poises measured with a Brookfield viscometer.

This wire enamel is coated onto a No. 35 gauge copper wire using an ordinary commercial wire coater that has a six foot horizontal curing oven and a roller die applicator. The temperature of the oven is about 260° C. at the entrance and about 450° C. at the exit. Six coating and baking applications are used on each wire resulting in a 1 mil increase in the diameter of the wire. Wire coating speeds of 70, 90 and 110 feet per minute are used and in each case the wire is coated with a uniform durable coating. Each of the wires are evaluated according to recognized test methods described in columns 4 and 5 of Sanders U.S. Pat. 2,787,603, issued Apr. 2, 1957, and found to have excellent dielectric strength of the insulation, high cut-through temperature, excellent abrasion resistance and excellent flexibility and are resistant to refrigerants, such as "Freon" 22, monochlorodifluoromethane.

The above wire enamel composition is knife-coated onto a steel plate and baked for about 30 minutes at 200° C. The resulting dried coating is about 1 mil thick and is tough, durable and temperature resistant.

EXAMPLE 2

The following amine terminated polymers can be prepared using the same procedure as in Example 1:

|  | Anhydride | Diamine |
|---|---|---|
| Polymer: |  |  |
| (A) | Pyromellitic dianhydride | m-Phenylene diamine. |
| (B) | 3,3'4,4'-benzophenone tetracarboxylic dianhydride | Methylene dianiline. |
| (C) | Monoacid chloride of trimellitic anhydride | Methylene dianiline. |
| (D) | Bis-(3,4-dicarboxyphenyl)sulfone dianhydride | Oxydianiline. |

EXAMPLE 2

The following amine terminated polymers can be prepared using the same procedure as in Example 1:

In each of the above polymers, the molar ratio of dianhydride to diamine should be about 9:10 to obtain an amine terminated polymer. The solvents and the reaction conditions are the same as in Example 1. Polymer (C) solution is filtered after polymerization. These polymers can be coated onto copper wire using the same procedure as used in Example 1. The resulting coated wire should have similar excellent properties as the wire coated in Example 1.

I claim:

1. A liquid coating composition comprising 5–30% by weight of a film-forming polymer blend and an inert organic solvent for the polymer blend wherein said polymer blend consists essentially of (A) 90–99% by weight, based on the weight of the polymer blend, of an amine terminated polymer having recurring structural units selected from the group consisting of

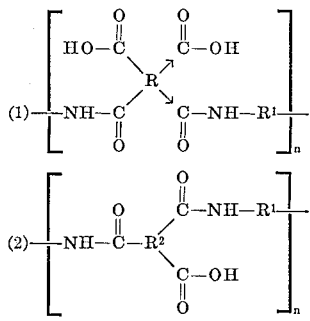

and a mixture of (1) and (2); wherein the arrows denote isomerism; wherein $n$ is a positive integer sufficiently high to provide a film-forming polymer having an inherent viscosity at 25° C. of at least 0.1, measured at about 0.5% polymer solids in N-methyl pyrrolidone wherein R is a tetravalent aromatic radical selected from the group consisting of

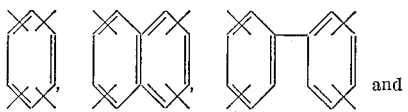
and

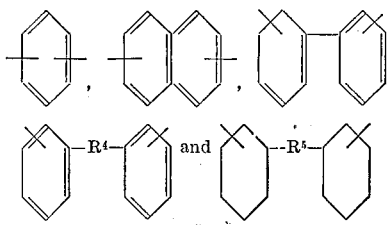

$R^1$ is a divalent aromatic radical selected from the group consisting of

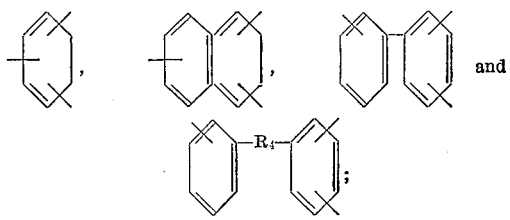

$R^2$ is a trivalent aromatic radical selected from the group consisting of

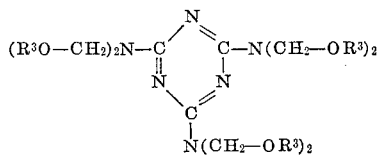

wherein $R^4$ is selected from the group consisting of an alkylene radical containing 1–3 carbon atoms, —O—, —S—, —SO$_2$— and

$R^5$ is an alkylene radical of 1–3 carbon atoms;

(B) 1–10% by weight, based on the weight of the polymer blend, of a reactive melamine resin of the formula $$(R^3O-CH_2)_2N-\underset{\underset{\underset{N(CH_2-OR^3)_2}{C}}{\overset{N}{\|}}}{C}\overset{N}{\underset{N}{\diagdown}}C-N(CH_2-OR^3)_2$$

wherein $R^3$ is selected from the group consisting of hydrogen and an alkyl group of 1–8 carbon atoms with no more than two of the $R^3$ groups being hydrogen.

2. The coating composition of claim 1 in which $R^3$ is methyl.

3. The coating composition of claim 2 in which R is

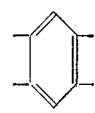

4. The coating composition of claim 3 in which $R^1$ is

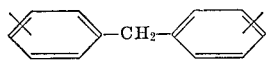

5. The coating composition of claim 3 in which $R^1$ is phenylene.

6. The coating composition of claim 3 in which $R^1$ is

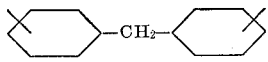

7. The coating composition of claim 3 in which $R^1$ is

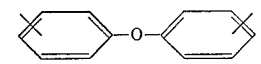

8. The coating composition of claim 7 in which the inert organic solvent is selected from the group consisting of dimethyl formamide, dimethyl acetamide and a mixture of N-methyl pyrrolidone and xylene.

9. The coating composition of claim 2 in which R is

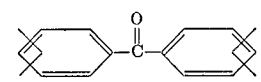

10. The coating composition of claim 9 in which $R^1$ is

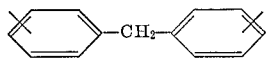

11. The coating composition of claim 9 in which $R^1$ is

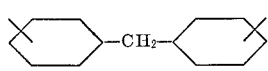

12. The coating composition of claim 9 in which $R^1$ is phenylene.

13. The coating composition of claim 9 in which $R^1$ is

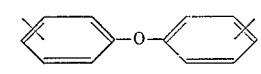

14. The coating composition of claim 2 in which $R^2$ is

15. The coating composition of claim 14 in which $R^1$ is

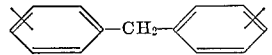

16. The coating composition of claim 14 in which $R^1$ is

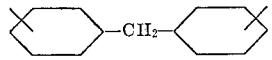

17. The coating composition of claim 14 in which $R^1$ is phenylene.

18. The coating composition of claim 14 in which $R^1$ is

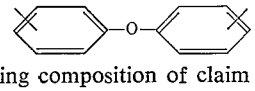

19. The coating composition of claim 2 in which R is

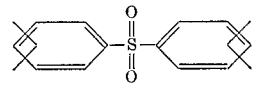

References Cited
UNITED STATES PATENTS

| | | | |
|---|---|---|---|
| 2,998,411 | 8/1961 | Housekeeper | 260—67.6 |
| 3,211,806 | 10/1965 | Petropoulos et al. | 260—853 |
| 3,416,994 | 12/1968 | Chalmers et al. | 161—227 |

MORRIS LIEBMAN, Primary Examiner

R. ZAITLEN, Assistant Examiner

U.S. Cl. X.R.

260—32.6, 33.6, 78, 853